(12) United States Patent
Kinoshita et al.

(10) Patent No.: US 8,860,392 B2
(45) Date of Patent: Oct. 14, 2014

(54) SEMICONDUCTOR DEVICE INCLUDING VOLTAGE GENERATING CIRCUIT

(75) Inventors: Hiromu Kinoshita, Kawasaki (JP); Shinsuke Yoshimura, Kawasaki (JP); Akira Suzuki, Kawasaki (JP); Akira Oizumi, Kawasaki (JP); Soichi Kobayashi, Kawasaki (JP)

(73) Assignee: Renesas Electronics Corporation, Kawasaki-Shi, Kanagawa (JP)

( * ) Notice: Subject to any disclaimer, the term of this patent is extended or adjusted under 35 U.S.C. 154(b) by 95 days.

(21) Appl. No.: 13/367,883

(22) Filed: Feb. 7, 2012

(65) Prior Publication Data

US 2013/0207634 A1   Aug. 15, 2013

(30) Foreign Application Priority Data

Feb. 18, 2011 (JP) ................... 2011-033469

(51) Int. Cl.
  *G05F 1/00*   (2006.01)
  *G05F 3/16*   (2006.01)
  *G05F 3/02*   (2006.01)

(52) U.S. Cl.
  CPC ........................................ *G05F 3/02* (2013.01)
  USPC ........................................... 323/283; 323/313

(58) Field of Classification Search
  USPC ................................................. 323/283, 313
  See application file for complete search history.

(56) References Cited

U.S. PATENT DOCUMENTS

| | | | |
|---|---|---|---|
| 6,262,567 B1 * | 7/2001 | Bartlett | 323/303 |
| 6,826,390 B1 | 11/2004 | Tamura | |
| 7,499,518 B2 * | 3/2009 | Tobita et al. | 377/64 |
| 7,751,139 B1 * | 7/2010 | Voo | 360/66 |
| 7,962,662 B2 * | 6/2011 | Richards et al. | 710/9 |
| 8,269,390 B2 | 9/2012 | Sakai et al. | |
| 8,456,347 B2 * | 6/2013 | Wikner | 341/159 |
| 2004/0189346 A1 | 9/2004 | Hirano | |
| 2005/0033902 A1 | 2/2005 | Tamura | |
| 2005/0184799 A1 | 8/2005 | Kii | |

(Continued)

FOREIGN PATENT DOCUMENTS

| | | |
|---|---|---|
| JP | 3-063805 A | 3/1991 |
| JP | 3-272166 A | 12/1991 |

(Continued)

OTHER PUBLICATIONS

Yuichi Okuda et al., "A Trimming-Free CMOS Bandgap-Reference Circuit with Sub-1-V-Supply Voltage Operation," 2007 Symposium on VLSI Circuts Digest of Technical Papers, pp. 96-97.

(Continued)

*Primary Examiner* — Adolf Berhane
*Assistant Examiner* — Emily P Pham
(74) *Attorney, Agent, or Firm* — McDermott Will & Emery LLP

(57) ABSTRACT

A semiconductor device includes a voltage generating circuit, a first switch, and a charging circuit. The voltage generating circuit generates a voltage for output and has a function to adjust a magnitude of the voltage to be generated. A first switch has a first conduction terminal and a second conduction terminal that are brought into conduction with each other in an ON state, and the first conduction terminal is connected to an output node of the voltage generating circuit via a first line. The charging circuit charges a second line connected to the second conduction terminal of the first switch.

8 Claims, 10 Drawing Sheets

(56) References Cited

U.S. PATENT DOCUMENTS

| | | |
|---|---|---|
| 2008/0242255 A1 | 10/2008 | Tamura |
| 2010/0327841 A1* | 12/2010 | Ito et al. .................. 323/313 |
| 2011/0012639 A1 | 1/2011 | Tamura |

FOREIGN PATENT DOCUMENTS

| | | |
|---|---|---|
| JP | 2001-027919 A | 1/2001 |
| JP | 2001-103098 A | 4/2001 |
| JP | 2001-274677 | 10/2001 |
| JP | 2004-289641 | 10/2004 |
| JP | 2005-242570 A | 9/2005 |
| JP | 2006-197749 A | 7/2006 |

OTHER PUBLICATIONS

Notice of Grounds of Rejection issued in Japanese Application No. 2011-033469 dated Apr. 15, 2014, w/English translation.

* cited by examiner

SEMICONDUCTOR DEVICE INCLUDING VOLTAGE GENERATING CIRCUIT

BACKGROUND OF THE INVENTION

1. Field of the Invention

This invention relates to a semiconductor device made of a plurality of components, including a voltage generating circuit.

2. Description of the Background Art

A semiconductor integrated circuit, such as a microcomputer or the like, includes a voltage down converter (VDC) for lowering an external power supply voltage to generate an internal power supply voltage, in order to supply a drive voltage to an internal circuit. The voltage down converter is usually constituted of a reference voltage generating circuit for generating a reference voltage and an internal power supply voltage generating circuit having a negative feedback loop. A representative reference voltage generating circuit is a band gap reference (BGR) circuit for generating a reference voltage of approximately 1.1 V by utilizing the band gap of silicon.

The internal power supply voltage is set to, for example, 1.5 V, in accordance with the product specifications. Although the reference voltage generating circuit and the internal power supply voltage generating circuit are designed so as to achieve this voltage set value, the internal power supply voltage sometimes deviates from the value at the time of design (design value), owing to variations in the manufacturing process. In particular, as a semiconductor integrated circuit becomes smaller, variations in characteristics of a circuit component becomes greater, thus inevitably resulting in an error between an actual value and the design value. For this reason, each of the reference voltage generating circuit and the internal power supply voltage generating circuit is provided with a trimming function for correcting such an error.

According to a typical trimming technique, the internal power supply voltage is measured by an analog-to-digital converter (ADC) incorporated in a semiconductor integrated circuit device, and trimming of the reference voltage generating circuit is performed such that the internal power supply voltage is set to a desired value (for example, 1.5 V).

A reference voltage outputted from the reference voltage generating circuit may be detected by the ADC in place of the internal power supply voltage. In this case, however, a voltage follower circuit needs to be provided to perform impedance conversion of an output from the reference voltage generating circuit. This is because, due to an insufficient charge supplying capability of the reference voltage generating circuit, directly connecting the reference voltage generating circuit and the ADC without a voltage follower circuit being interposed therebetween causes the reference voltage to change due to charge sharing.

Additionally, charge sharing often becomes a problem in a dynamic logic circuit, and therefore, methods for avoiding charge sharing have been proposed. For example, in the method described in Japanese Patent Laying-Open No. 2004-289641, in order to prevent supplied charges from being transferred to a neighboring node at the time of pre-charging a line in a logic circuit, a node to which charges may be transferred from the pre-charged line is also pre-charged. Japanese Patent Laying-Open No. 2001-274677 discloses a cross-coupled load-type dynamic logic circuit. In this circuit, charges that have been stored at a dynamic node may be transferred to a sub-dynamic node to which a plurality of load transistors are connected. Thus, the sub-dynamic node is also pre-charged at the time of pre-charging the dynamic node.

Conventional techniques for trimming a reference voltage generating circuit have problems with accuracy in measurement of the reference voltage. That is, when trimming of the reference voltage generating circuit is performed based on a result of observing the internal power supply voltage, the observed data of the internal power supply voltage includes not only an error in the reference voltage generating circuit, but also that in the internal power supply voltage generating circuit. In the case of the method wherein the reference voltage is measured by way of a voltage follower circuit, observed data includes the influence of offset of the voltage follower circuit. In either case, since the accuracy in measurement of the reference voltage is limited, it is difficult to adjust the reference voltage to a desired value.

As already described, if the reference voltage generating circuit and ADC are directly connected to each other without a voltage follower circuit being interposed therebetween, the influence of offset of the voltage follower circuit can be avoided; however, the reference voltage changes due to charge sharing. Changes in the reference voltage also causes great changes in the internal power supply voltage generated based on the reference voltage, thus possibly causing the internal circuit that operates on the internal power supply voltage to run away out of control or be broken down.

SUMMARY OF THE INVENTION

An object of this invention is to provide a semiconductor device including a voltage generating circuit, in which even when the voltage generating circuit does not have a sufficient charge supplying capability, output voltage from the voltage generating circuit can be detected with accuracy higher than that in conventional examples, without causing charge sharing.

A semiconductor device according to one embodiment of this invention includes a voltage generating circuit, a first switch, and a charging circuit. The voltage generating circuit generates a voltage for output and has a function to adjust a magnitude of the voltage to be generated. A first switch has a first conduction terminal and a second conduction terminal brought into conduction with each other in an ON state, and the first conduction terminal is connected to an output node of the voltage generating circuit via a first line. The charging circuit charges a second line connected to the second conduction terminal of the first switch.

According to the above-described embodiment, the second line connected to the voltage generating circuit via the first switch can be charged by the charging circuit. Accordingly, a principal advantage of this invention is that even when the voltage generating circuit does not have a sufficient charge supplying capability, output voltage from the voltage generating circuit can be detected with accuracy higher than that in conventional examples, without causing charge sharing.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
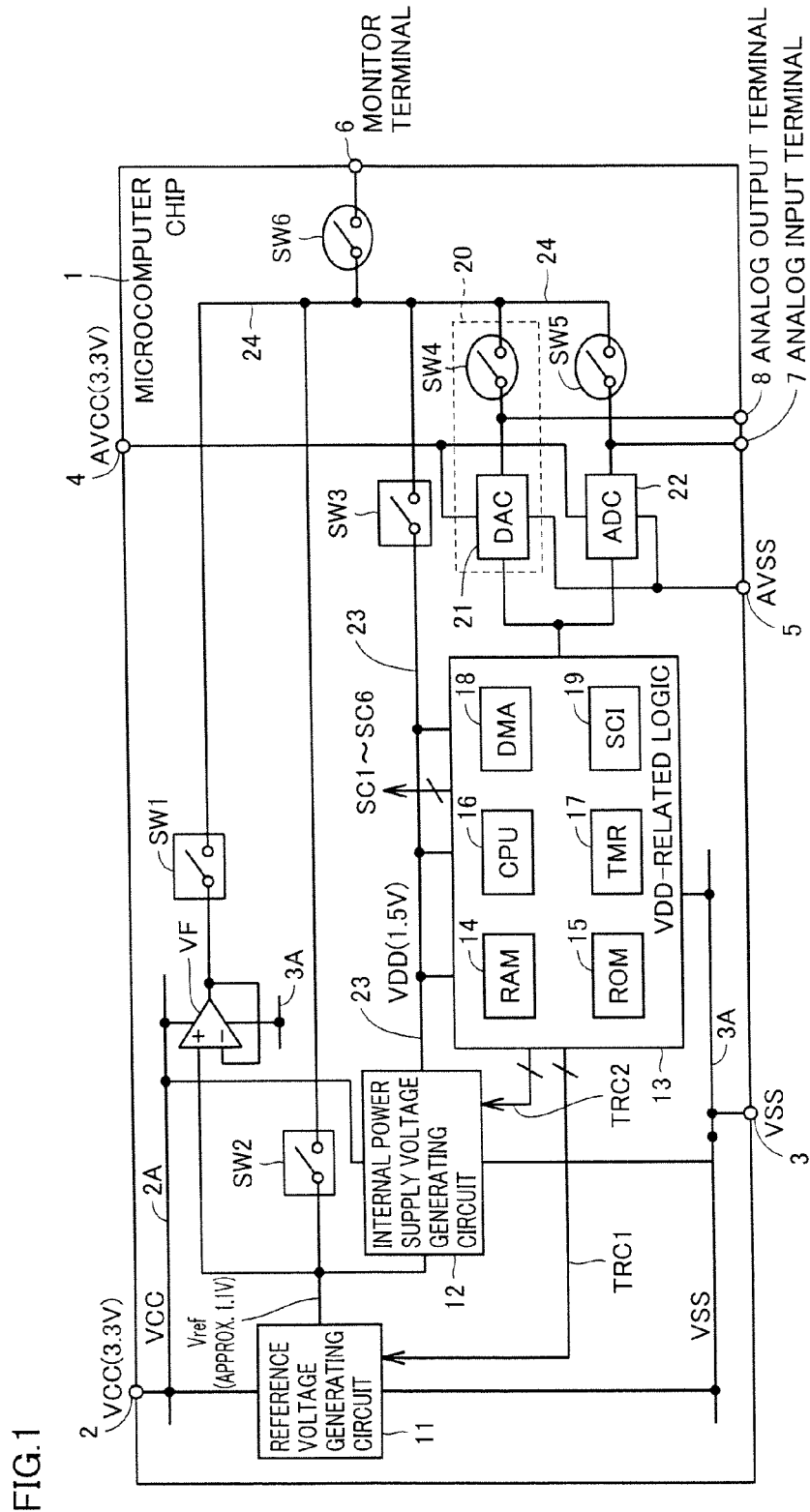
FIG. 1 is a block diagram showing a configuration of a semiconductor device according to one embodiment of this invention.

Embodiments of the present invention will hereinafter be described in detail with reference to the drawings. Note that identical or corresponding parts are denoted by identical reference characters, and description thereof will not be repeated.

[General Configuration of Microcomputer Chip]

FIG. 1 is a block diagram showing a configuration of a semiconductor device according to one embodiment of this invention. FIG. 1 shows a microcomputer chip 1 as one example of a representative semiconductor device to which this invention is applied.

Referring to FIG. 1, microcomputer chip 1 includes a power supply terminal 2 supplied with an external power supply voltage VCC, a ground terminal 3 supplied with a ground voltage VSS, a power supply terminal 4 supplied with an external power supply voltage AVCC, and a ground terminal 5 supplied with a ground voltage AVSS. Although power supply terminals 2 and 4 may be connected to a common power supply outside microcomputer chip 1, power supply terminals 2 and 4 are not directly connected to each other within microcomputer chip 1. Therefore, external power supply voltages VCC and AVCC are handled as power supply voltages independent of each other. Similarly, although ground terminals 3 and 5 are connected to the external common ground, ground terminals 3 and 5 are not directly connected to each other on microcomputer chip 1. Therefore, ground voltages VSS and AVSS are handled as ground voltages independent of each other. In particular, power supply terminal 4 and ground terminal 5 are desirably provided with a protection circuit so as to prevent breakdown of the internal circuit due to incoming noise. In this embodiment, external power supply voltages VCC, AVCC are 3.3 V.

Microcomputer chip 1 further includes a reference voltage generating circuit 11, an internal power supply voltage generating circuit 12, a VDD-related logic circuit 13 as an internal circuit, an analog test bus 24, an amplifier VF, an ADC 22, a Digital-to-Analog Converter (DAC) 21, and switches SW1 to SW6. Amplifier VF is used as a voltage follower that converts an output impedance of reference voltage generating circuit 11.

Reference voltage generating circuit 11, internal power supply voltage generating circuit 12, and amplifier VF receive external power supply voltage VCC via a power supply line 2A connected to power supply terminal 2, and receive ground voltage VSS via a ground line 3A connected to ground terminal 3. DAC 21 and ADC 22 receive external power supply voltage AVCC via power supply terminal 4, and receive ground voltage AVSS via ground terminal 5.

Reference voltage generating circuit 11 generates, based on external power supply voltage VCC, a reference voltage Vref whose dependence on external power supply voltage VCC and an environmental temperature is extremely low, and outputs the generated reference voltage Vref. Reference voltage generating circuit 11 is provided with a function to adjust the voltage to be generated (trimming function). In this embodiment, a BGR circuit is used as reference voltage generating circuit 11. A reference voltage of approximately 1.1 V is generated by the BGR circuit. A detailed configuration of reference voltage generating circuit 11 will be described below with reference to FIGS. 2 to 5.

Internal power supply voltage generating circuit 12 generates an internal power supply voltage VDD, which is a drive voltage for driving VDD-related logic circuit 13, based on reference voltage Vref. Internal power supply voltage generating circuit 12 is provided with a function to adjust the voltage to be generated (trimming function). In the case of this embodiment, internal power supply voltage generating circuit 12 generates a constant voltage (1.5 V) unaffected by fluctuations in external power supply voltage VCC, by way of feedback control using reference voltage Vref as a target value. A detailed configuration of internal power supply voltage generating circuit 12 will be described below with reference to FIG. 6.

VDD-related logic circuit 13 is connected to a line 23 for supplying internal power supply voltage VDD drawn from an output node of internal power supply voltage generating circuit 12 and operates using internal power supply voltage VDD as a drive voltage. Ground voltage VSS is supplied to VDD-related logic circuit 13 via ground line 3A. As shown in FIG. 1, VDD-related logic circuit 13 includes a central processing unit (CPU) 16, a Random Access Memory (RAM) 14, a Read Only Memory (ROM) 15, a timer circuit (TMR) 17, a direct memory access (DMA) control circuit 18, a serial communication interface (SCI) 19, and the like.

Analog test bus 24 is used as a bus for connecting reference voltage generating circuit 11 and ADC 22, and connecting internal power supply voltage generating circuit 12 and ADC 22, when adjusting the values of reference voltage Vref and internal power supply voltage VDD. Analog test bus 24 is connected to an output node of reference voltage generating circuit 11 via switch SW2, and connected to line 23 for supplying internal power supply voltage VDD via switch SW3. Analog test bus 24 is further connected to an output node of amplifier VF used as a voltage follower via switch SW1. In microcomputer chip 1 of this embodiment, reference voltage Vref can be measured without using a voltage follower, and therefore, amplifier VF and switch SW1 are not necessarily required.

ADC 22 converts an inputted analog voltage to a digital value for output. An input node of ADC 22 is connected to analog test bus 24 via switch SW5. Reference voltage Vref and internal power supply voltage VDD are inputted to the input node of ADC 22 via switch SW5 and analog test bus 24.

DAC 21 converts an inputted digital value to an analog voltage for output. An output node of DAC 21 is connected to analog test bus 24 via switch SW4. As described below, DAC 21 and switch SW4 are used as a charging circuit 20 for pre-charging the line connected to switch SW2, including analog test bus 24, when reference voltage Vref is measured by ADC 22.

Microcomputer chip 1 further includes a monitor terminal 6, an analog input terminal 7, and an analog output terminal 8. Although not illustrated in the figure, microcomputer chip 1 is also provided with a plurality of general-purpose input/output terminals and the like.

Monitor terminal 6 is connected to analog test bus 24 via a switch SW6. Monitor terminal 6 is used as a terminal for externally outputting reference voltage Vref and internal power supply voltage VDD when reference voltage Vref and internal power supply voltage VDD are measured by an external device.

Analog input terminal 7, which is connected to an input node of ADC 22, is provided as a terminal for inputting an externally inputted analog voltage to ADC 22. Analog output terminal 8, which is connected to an output node of DAC 21, is provided as a terminal for externally outputting an analog voltage outputted from DAC 21.

Lengths of lines connecting the above-described various components desirably satisfy the following relation. Desirably, the length of a line from reference voltage generating circuit 11 to switch SW2 is shorter than that of a line from switch SW2 to switch SW4 (including a portion of analog test bus 24), and hence, shorter than the length of the line from switch SW2 to DAC 21. Desirably, the length of a line from switch SW4 to switch SW3 is shorter than that of a line from switch SW4 to switch SW2. Desirably, the length of the line from reference voltage generating circuit 11 to switch SW2 is shorter than that of a line from internal power supply voltage generating circuit 12 to switch SW3 (including line 23). Desirably, the length of a line from switch SW4 to switch SW5 is shorter than that of the line from switch SW4 to switch SW2.

[Configuration of Reference Voltage Generating Circuit]

Figure 2:
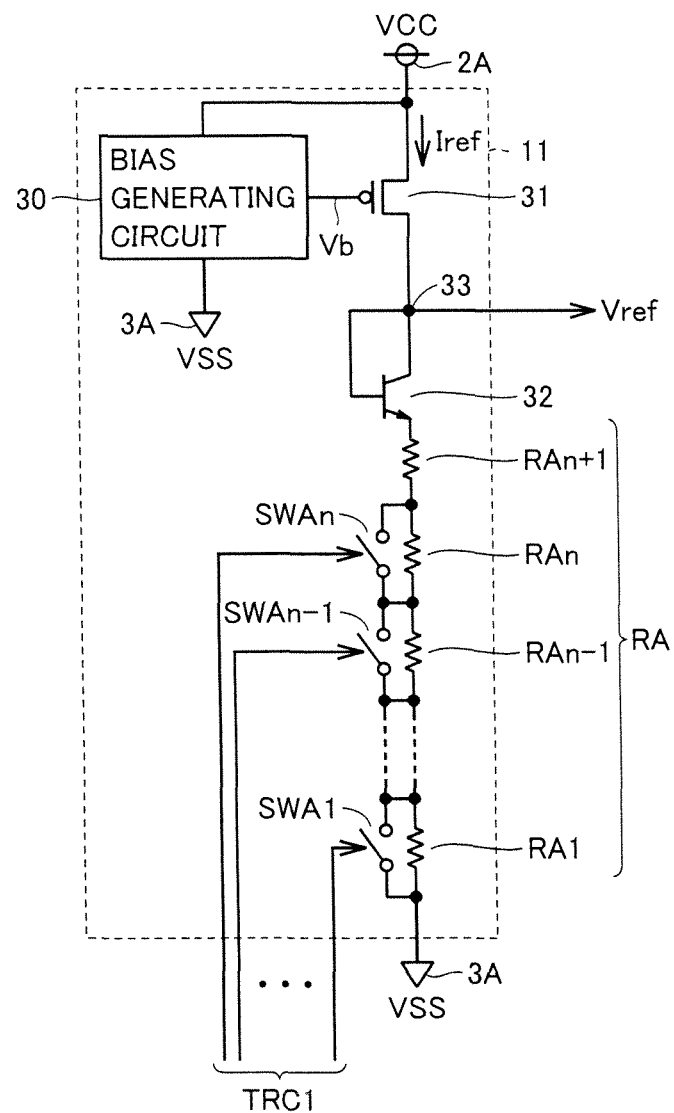
FIG. 2 is a circuit diagram showing a configuration of a reference voltage generating circuit 11 in FIG. 1.

FIG. 2 is a circuit diagram showing a configuration of reference voltage generating circuit 11 in FIG. 1.

Figure 3:
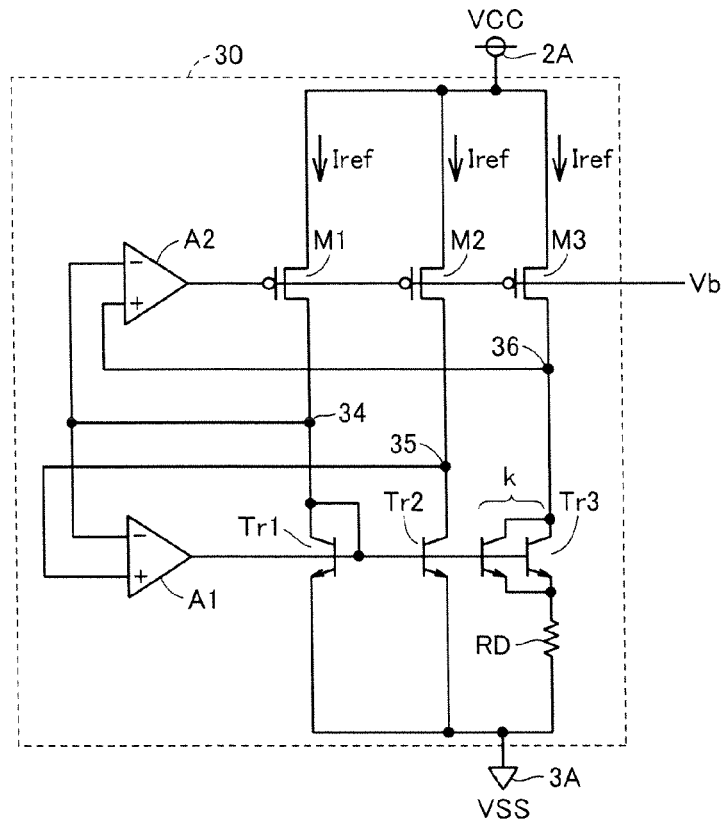
FIG. 3 is a circuit diagram showing a configuration of a bias generating circuit 30 in FIG. 2.

FIG. 3 is a circuit diagram showing a configuration of a bias generating circuit 30 in FIG. 2. Reference voltage generating circuit 11 shown in each of FIGS. 2 and 3 is the BGR circuit disclosed in the document of Y. Okuda et al. ("A Trimming-Free CMOS Bandgap-Reference Circuit with Sub-1-V-Supply Voltage Operation", 2007 Symposium on VLSI Circuits Digest of Technical Papers, pp. 96-97).

Referring to FIGS. 2 and 3, reference voltage generating circuit 11 includes bias generating circuit 30, a PMOS (Positive-channel Metal Oxide Semiconductor) transistor 31, an NPN-type bipolar transistor 32, n+1 number of resistor elements RA1 to RAn+1 (collectively referred to as "resistor element RA"), and n number of switches SWA1 to SWAn. Bias generating circuit 30 includes PMOS transistors M1 to M3, NPN-type bipolar transistors Tr1 to T3, operational amplifiers A1, A2, and a resistor element RD. Bipolar transistor Tr3 is formed of k number of bipolar transistors connected in parallel. Each of switches SWA1 to SWAn is constituted of an NMOS (Negative-channel MOS) transistor, a transmission gate, or the like. Connections among elements constituting reference voltage generating circuit 11 will first be described below.

Transistors M1, Tr1 are sequentially connected in series between power supply line 2A and ground line 3A. Similarly, transistors M2, Tr2 are sequentially connected in series between power supply line 2A and ground line 3A, and transistors M3, Tr3 and resistor element RD are sequentially connected in series between power supply line 2A and ground line 3A. Transistors 31, 32 and n+1 number of resistor elements RAn+1, RAn, ..., and RA1 are sequentially connected in series between power supply line 2A and ground line 3A. Each of transistors Tr1 and 32 is a diode-connected transistor whose base and collector are connected to each other. Voltage at the collector (a node 33) of transistor 32 is outputted as reference voltage Vref.

Switches SWA1 to SWAn are connected in parallel to resistor elements RA1 to RAn, respectively, and each is controlled to be turned on or off by a trimming control signal TRC1. Trimming control signal TRC1 is a multi-bit (n-bit) signal corresponding to a set value of a register (not illustrated) provided within VDD-related logic circuit 13 in FIG. 1. Switches SWA1 to SWAn are selectively switched on or off in response to trimming control signal TRC1, thereby adjusting a resistance value between the emitter of transistor 32 and ground line 3A.

Operational amplifier A1 has its inverting input terminal connected to a drain (a node 34) of PMOS transistor M1, its non-inverting input terminal connected to a drain (a node 35) of PMOS transistor M2, and its output terminal connected to a base of each of bipolar transistors Tr1 to Tr3. Operational amplifier A2 has its non-inverting input terminal connected to a drain (a node 36) of PMOS transistor M3, its inverting input terminal connected to the drain (node 34) of PMOS transistor M1, and its output terminal connected to a gate of each of PMOS transistors M1 to M3 and 31. Output voltage from operational amplifier A2 is defined as Vb.

Next, operation of reference voltage generating circuit 11 will be described. Assuming that PMOS transistors M1 to M3 and 31 are equal in size (a ratio of a channel width W to a channel length L, W/L), current Iref flowing through each PMOS transistor is equal (hereinafter referred to as "reference current Iref"). Base-emitter voltages of bipolar transistors Tr1 and Tr3 are defined as Vbe1 and Vbe3, respectively, and a resistance value of resistor element RD is defined as rd. Reference current Iref is determined by operational amplifier A2 such that a potential of drain (node 34) of PMOS transistor M1 is equal to that of the drain (node 36) of PMOS transistor M3, and hence, reference current Iref satisfies the relation:

$$Vbe1 = Vbe3 + Iref \times rd \quad (1)$$

From equation (1) above, reference current Iref can be found as follows:

$$Iref = (Vbe1 - Vbe3)/rd \quad (2)$$

Operational amplifier A1 is provided so as to suppress fluctuations in reference current Iref due to offset of operational amplifier A2.

When base-emitter voltage of bipolar transistor 32 is defined as Vbe4, and a resistance value from an emitter of transistor 32 to ground line 3A is defined as ra, reference voltage Vref can be given as follows:

$$\begin{aligned} Vref &= Vbe4 + Iref \times ra \\ &= Vbe4 + (Vbe1 - Vbe3) \times ra/rd \end{aligned} \quad (3)$$

where a temperature coefficient of Vbe4 is negative, and a temperature coefficient of Vbe1−Vbe3 is $(B/q) \times \ln(k)$ (where B represents a Boltzmann's constant, q represents a quantum of electricity, ln represents a natural logarithm, and k represents the number of parallel-connected bipolar transistors Tr3), and thus positive. Therefore, a temperature coefficient of output voltage Vref can be made zero by adjusting the ratio of resistance values, ra/rd. Since resistance value ra can be adjusted by trimming control signal TRC1, the temperature coefficient of reference voltage Vref can be set to substantially zero by adjusting resistance value ra, even when the temperature coefficients and the ratio of resistance values, ra/rd, deviate from their design values owing to the influence of the fabrication process of semiconductor devices.

Figure 4:
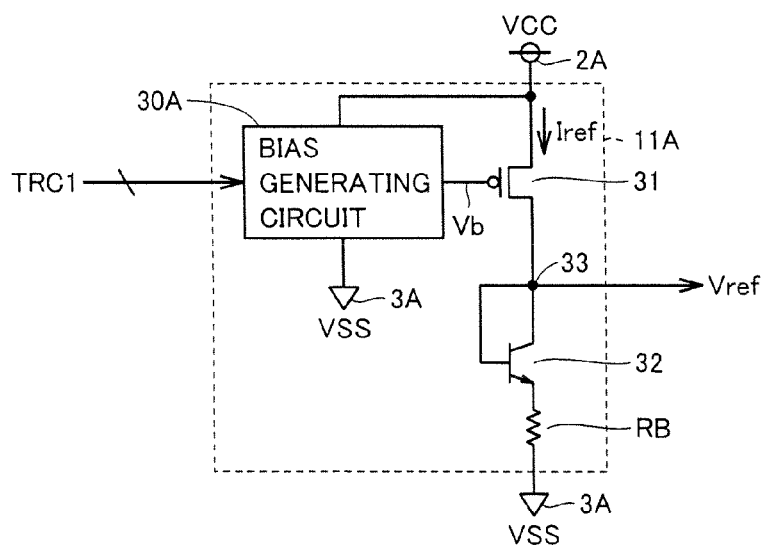
FIG. 4 is a circuit diagram showing a configuration of a reference voltage generating circuit 11A as a modification of reference voltage generating circuit 11 in FIG. 1.

FIG. 4 is a circuit diagram showing a configuration of a reference voltage generating circuit 11A as a modification of reference voltage generating circuit 11 in FIG. 1.

Figure 5:
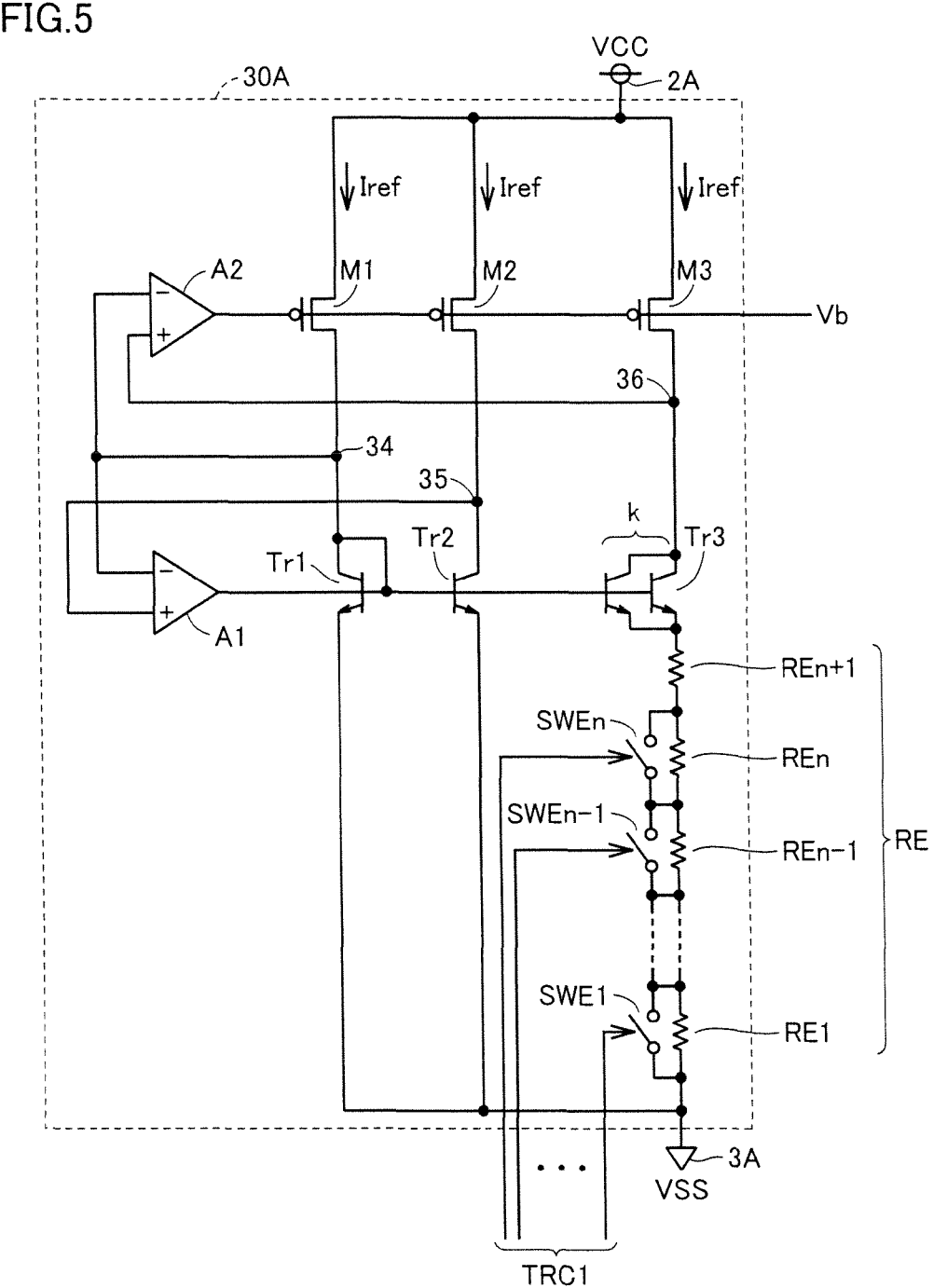
FIG. 5 is a circuit diagram showing a configuration of a bias generating circuit 30A in FIG. 4.

FIG. 5 is a circuit diagram showing a configuration of a bias generating circuit 30A in FIG. 4. Referring to FIGS. 4 and 5, reference voltage generating circuit 11A differs from reference voltage generating circuit 11 in each of FIGS. 2 and 3 in that a resistor element RB is provided between the emitter of transistor 32 and ground line 3A, in place of resistor elements RA1 to RAn+1 and switches SWA1 to SWAn. Reference voltage generating circuit 11A also differs from reference voltage generating circuit 11 in each of FIGS. 2 and 3 in that n+1 number of resistor elements RE1 to REn+1 (collectively referred to as resistor element RE) and n number of switches SWE1 to SWEn are provided in place of resistor element RD. Resistor elements RE1 to REn+1 are sequentially connected in series between ground line 3A and an emitter of transistor Tr3. Switches SWE1 to SWEn are connected in parallel to resistor elements RE1 to REn, respectively, and each is controlled to be turned on or off by a trimming control signal TRC1. That is, a resistance value between the emitter of transistor Tr3 and ground line 3A (corresponding to resistance value rd according to equation (3)) can be adjusted by trimming control signal TRC1. Therefore, as in the case of reference voltage generating circuit 11 shown in each of FIGS. 2 and 3, the temperature coefficient of reference voltage Vref can be adjusted to substantially zero.

[Configuration of Internal Power Supply Voltage Generating Circuit]

Figure 6:
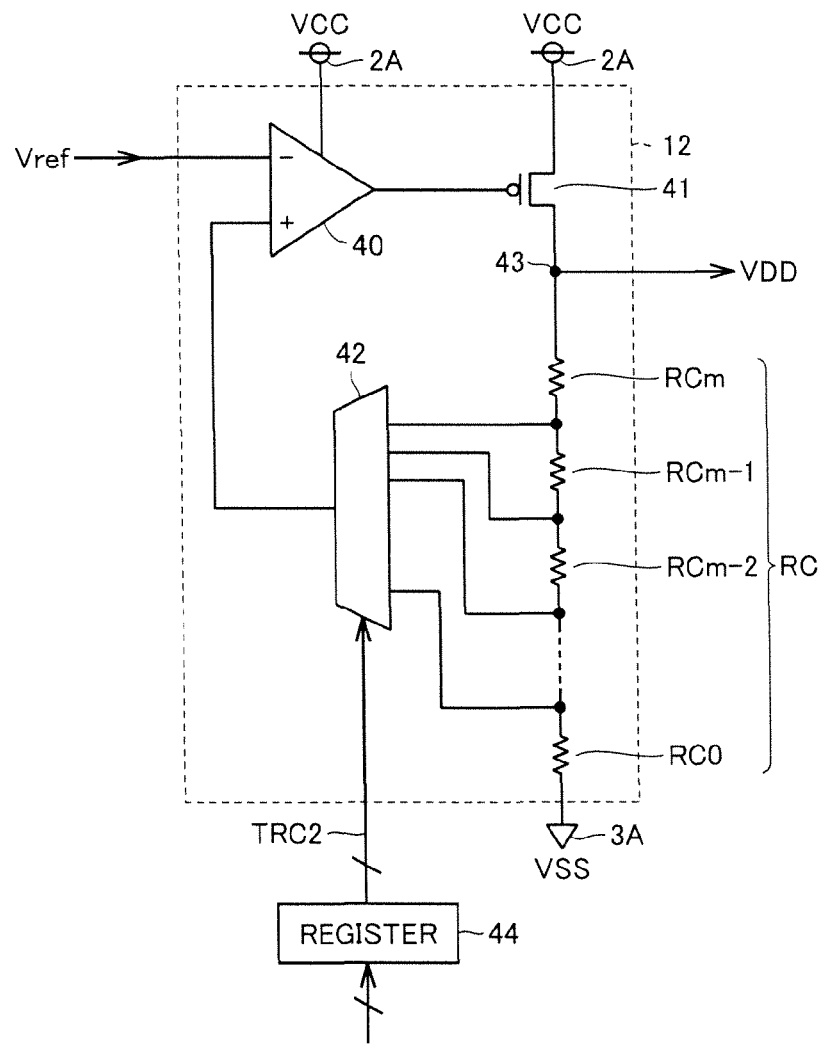
FIG. 6 is a circuit diagram showing a configuration of an internal power supply voltage generating circuit 12 in FIG. 1.

FIG. 6 is a circuit diagram showing a configuration of internal power supply voltage generating circuit 12 in FIG. 1.

Referring to FIG. 6, internal power supply voltage generating circuit 12 includes a differential amplifier 40, a PMOS transistor 41, m+1 (where m is an integer of 2 or more) number of resistor elements RC_0 to RC_m (collectively referred to as resistor element RC), and a selection circuit 42. Differential amplifier 40 receives reference voltage Vref at its inverting input terminal, and has its non-inverting input terminal connected to an output node of selection circuit 42 and its output terminal connected to a gate of PMOS transistor 41. PMOS transistor 41 has its source connected to power supply line 2A. Resistor elements RC_0 to RC_m are sequentially connected in series between ground line 3A and a drain of PMOS transistor 41. Internal power supply voltage VDD is outputted from the drain (a node 43) of the PMOS transistor. Selection circuit 42 outputs voltage at a node selected from m number of connection nodes of resistor elements RC_0 to RC_m by a trimming control signal TRC2 to the non-inverting input terminal of differential amplifier 40. Trimming control signal TRC2 is a multi-bit signal corresponding to a set value of a register 44 provided within VDD-related logic circuit 13 in FIG. 1.

Owing to the above-described configuration, PMOS transistor 41 functions like a variable resistance. That is, when drain voltage of PMOS transistor 41 is lower than a desired voltage, PMOS transistor 41 operates to increase charge flow from its source to its drain, and when the drain voltage of PMOS transistor 41 is higher than a desired voltage, PMOS transistor 41 operates to reduce the flow of charges from its source to its drain. Consequently, negative feedback acts such that the drain voltage of PMOS transistor 41 is always stabilized at a desired voltage (internal power supply voltage VDD). To which voltage internal power supply voltage VDD is to be adjusted is determined depending on a design value of resistance between channels of PMOS transistor 41 (that is, design values of a channel length L, a channel width W, and an amount of implanted dopant, as well as settings of a recipe used for a diffusion process and the like of PMOS transistor 41) and design values of resistance of resistor element RC formed of a P-type well or the like (that is, design values of a length L, a width W, and an amount of implanted dopant, as well as settings of a recipe used for a diffusion process and the like of a P-type well resistor). Note that an error would be produced between these design values and actual values owing to variations in the manufacturing process, and therefore, a voltage value to be inputted to the non-inverting input terminal of differential amplifier 40 is adjusted by trimming control signal TRC2 such that internal power supply voltage VDD achieves a desired value even when an error is produced.

[Configurations of Switches SW1 to SW6]

Figure 7:
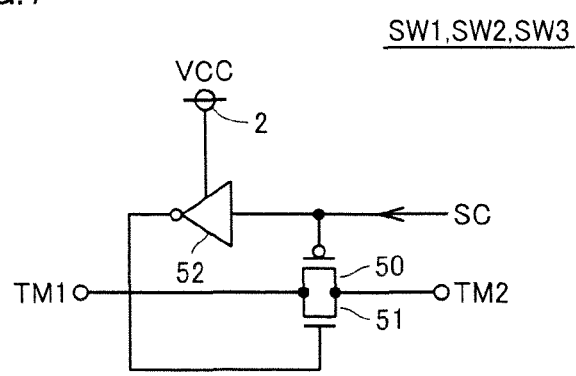
FIG. 7 is a circuit diagram showing a detailed configuration of each of switches SW1, SW2, and SW3 in FIG. 1.

FIG. 7 is a circuit diagram showing a detailed configuration of each of switches SW1, SW2, and SW3 in FIG. 1.

The switch shown in FIG. 7 includes conduction terminals TM1, TM2, a transmission gate constituted of a PMOS transistor 50 and an NMOS transistor 51 provided between these conduction terminals TM1 and TM2, and an inverter 52 driven by external power supply voltage VCC. A switch control signal SC is inputted to a gate of PMOS transistor 50, and a signal obtained by inverting a logic level of switch control signal SC with inverter 52 is inputted to a gate of NMOS transistor 51.

Switch control signals SC (denoted as SC1, SC2, and SC3) are provided for respective switches SW1, SW2, and SW3, whose logic levels are switched in response to the set value of the register (not illustrated) provided within VDD-related logic circuit 13 in FIG. 1. When switch control signal SC is at a high level (H level), a non-conducting state is established between conduction terminals TM1 and TM2. When switch control signal SC is at a low level (L level), a conducting state is established between conduction terminals TM1 and TM2.

Figure 8:
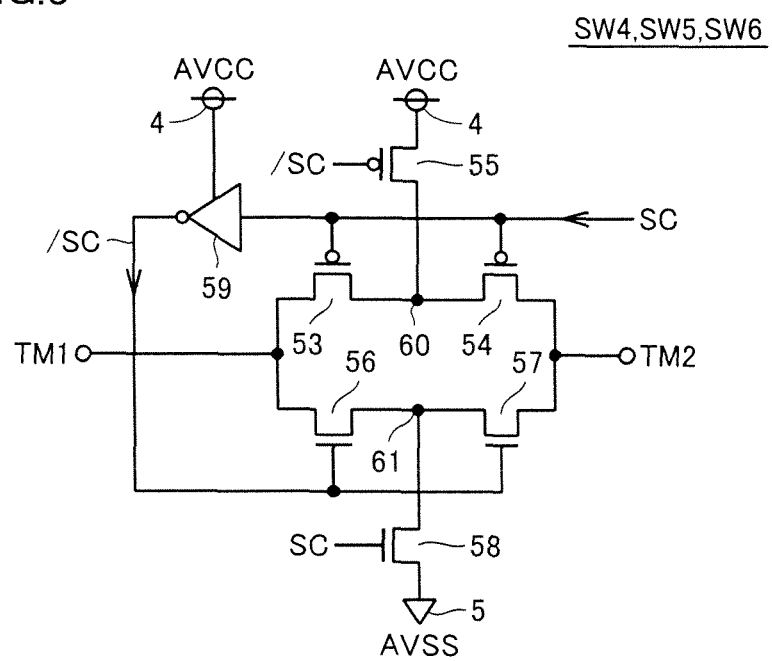
FIG. 8 is a circuit diagram showing a detailed configuration of each of switches SW4, SW5, and SW6 in FIG. 1.

FIG. 8 is a circuit diagram showing a detailed configuration of each of switches SW4, SW5, and SW6 in FIG. 1.

The switch shown in FIG. 8 includes conduction terminals TM1, TM2, PMOS transistors 53 to 55, NMOS transistors 56 to 58, and an inverter 59 driven by external power supply voltage AVCC. PMOS transistors 53, 54 are connected in series between conduction terminals TM1 and TM2, and NMOS transistors 56, 57 are connected in series between conduction terminals TM1 and TM2 and connected in parallel with a set of PMOS transistors 53, 54 connected in series, thereby constituting a T-shaped transmission gate. A connection node 60 of PMOS transistors 53, 54 is connected to power supply terminal 4 via PMOS transistor 55. A connection node 61 of NMOS transistors 56, 57 is connected to ground terminal 5 via NMOS transistor 58. Switch control signal SC is inputted to gates of PMOS transistors 53, 54 and a gate of NMOS transistor 58. A signal /SC obtained by inverting a logic level of switch control signal SC with inverter 59 is inputted to a gate of PMOS transistor 55 and gates of NMOS transistors 56, 57.

Switch control signals SC (denoted as SC4, SC5, and SC6) are provided for respective switches SW4, SW5, and SW6, whose logic levels are switched in response to the set value of the register (not illustrated) provided within VDD-related logic circuit 13 in FIG. 1. When switch control signal SC is at H level, a non-conducting state is established between conduction terminals TM1 and TM2, and simultaneously, voltage at node 60 is initialized to external power supply voltage AVCC and voltage at node 61 is initialized to ground voltage AVSS. When switch control signal SC is at L level, a conducting state is established between conduction terminals TM1 and TM2.

Generally, the switches of the T-shaped transmission gate configuration shown in FIG. 8 are used for a position directly connected to an external terminal or a signal line that should be handled carefully with respect to noise, and the switches shown in FIG. 7 that are smaller in circuit area are used for other positions.

[Method of Trimming Reference Voltage Generating Circuit]

Figure 9:
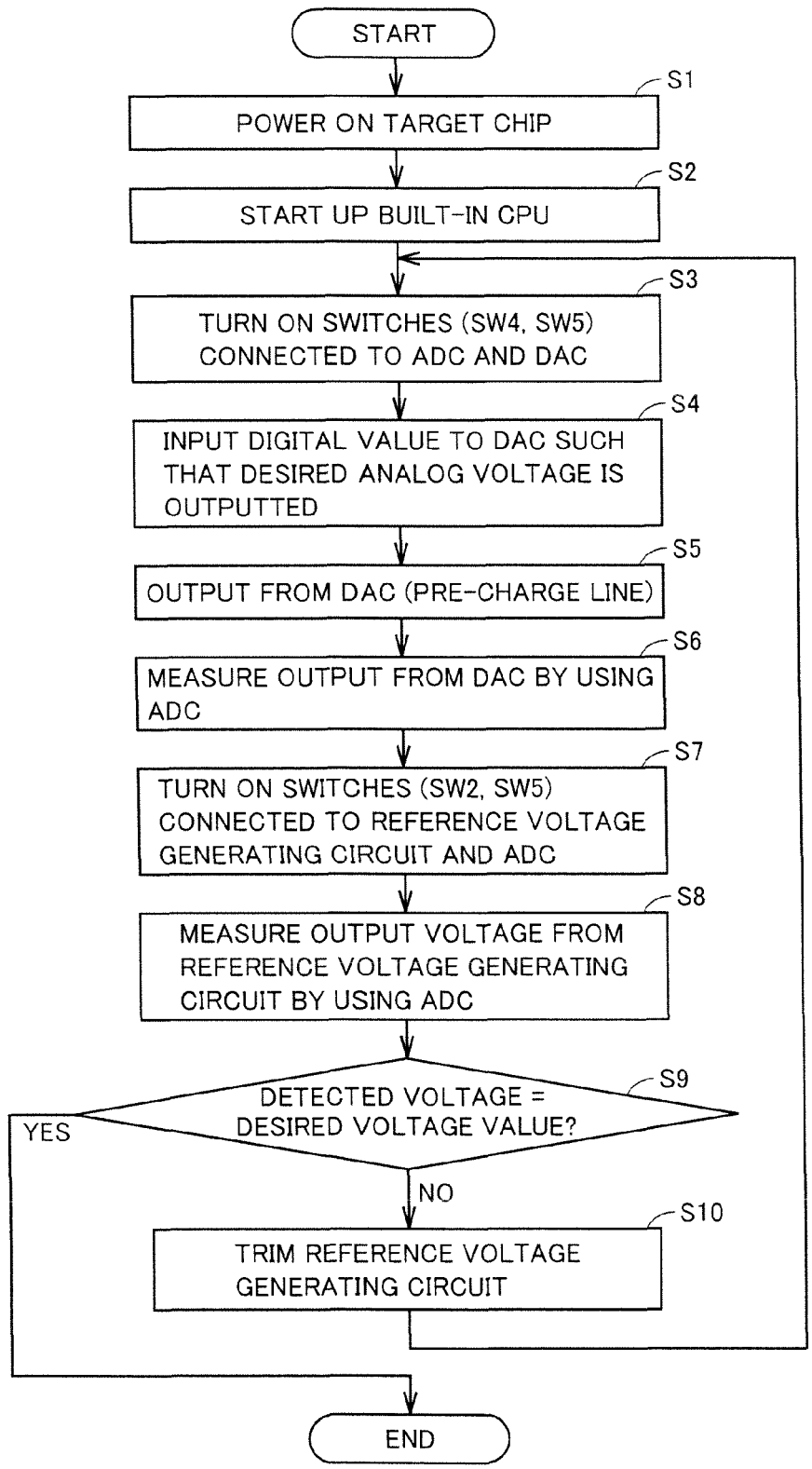
FIG. 9 is a flow chart showing a procedure for trimming reference voltage generating circuit 11 in FIG. 1.

FIG. 9 is a flow chart showing a procedure for trimming reference voltage generating circuit 11 in FIG. 1.

Referring to FIGS. 1 and 9, at step S1, external power supply voltages VCC, AVCC are applied to microcomputer chip 1 to be trimmed.

At next step S2, built-in CPU 16 starts up in accordance with a program stored in ROM 15 or RAM 14 incorporated in microcomputer chip 1, or stored in an external memory. In an initial state, switches SW1 to SW6 are in the OFF state.

At next step S3, CPU 16 sets the value of the register for controlling the opening and closing of switches SW1 to SW6 such that switch SW4 connected to DAC 21 and switch SW5 connected to ADC 22 are turned on. Here, switches SW1 to SW3 and SW6 are in the OFF state.

At next step S4, CPU 16 inputs a digital value to DAC 21 such that a desired analog voltage (approximately 1.1 V) is outputted therefrom. Consequently, the lines are pre-charged by the output voltage from DAC 21 (step S5).

Figure 10:
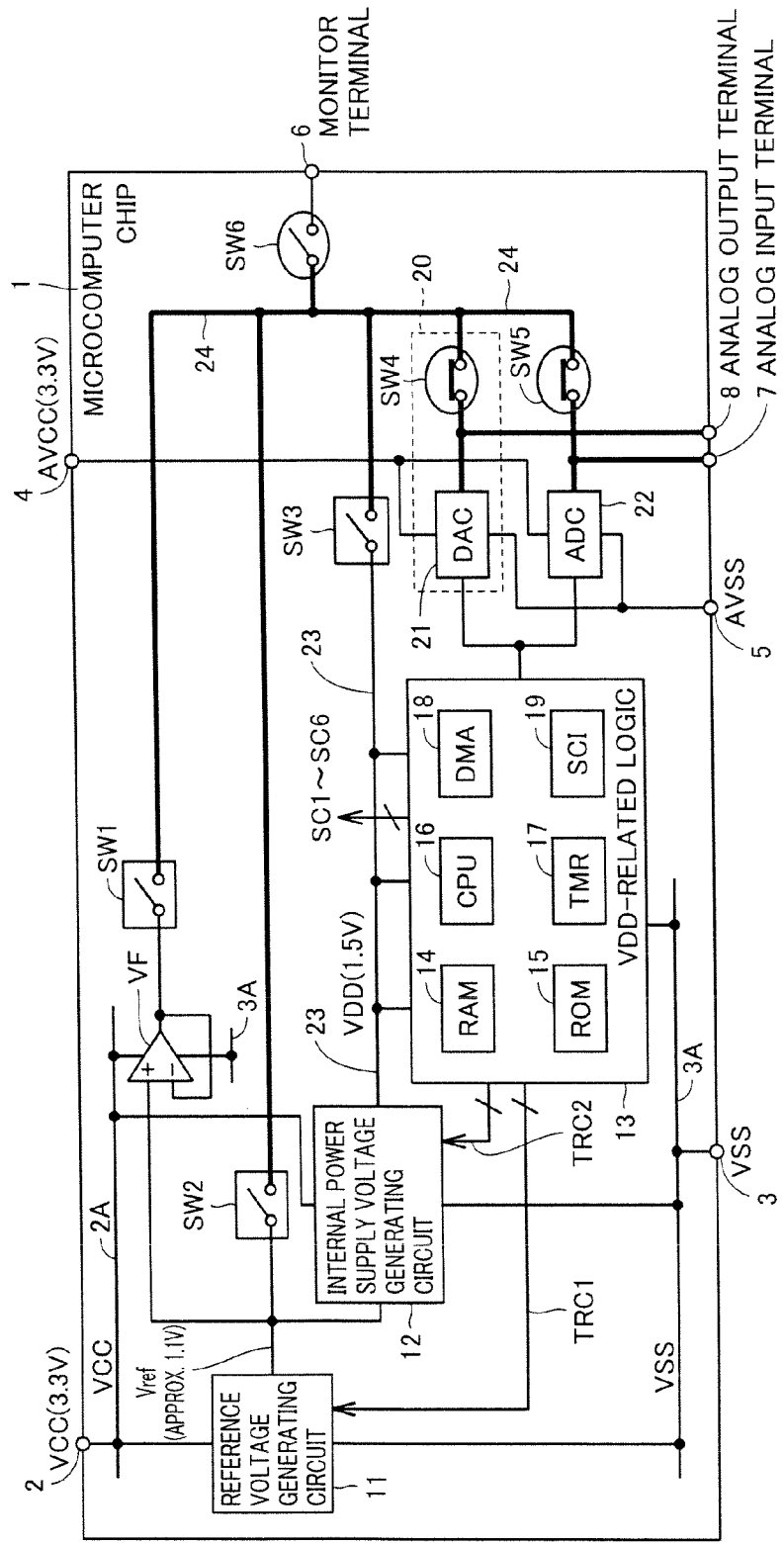
FIG. 10 is a diagram for explaining step S5 in FIG. 9.

FIG. 10 is a diagram for explaining step S5 in FIG. 9. Referring to FIGS. 9 and 10, a line from DAC 21 to analog test bus 24, analog test bus 24, a line from analog test bus 24 to ADC 22, and a line from analog test bus 24 to each of switches SW1, SW2, and SW3 are pre-charged. In FIG. 10, the pre-charged lines are indicated by the bold lines. In order to minimize changes in reference voltage Vref when measuring reference voltage Vref at step S8 described below, it is desirable that switch SW2 be disposed near reference voltage generating circuit 11, thereby making the length of a line from reference voltage generating circuit 11 to switch SW2 shorter than that of a line from switch SW2 to DAC 21.

At next step S6, CPU 16 measures an output from the DAC by using ADC 22. Completion of pre-charge of the lines can be confirmed when the value detected by ADC 22 has achieved a desired voltage value. Step S6, however, is not necessarily required. After confirming the completion of pre-charge by the measurement using ADC 22, or after a predetermined period of time has elapsed since the start of pre-charge, CPU 16 completes the pre-charge by turning off switch SW4.

At next step S7, CPU 16 sets the value of the register for controlling the opening and closing of switches SW1 to SW6 such that switch SW2 connected to reference voltage generating circuit 11 and switch SW5 connected to ADC 22 are turned on. Here, switches SW1, SW3, SW4, and SW6 are in the OFF state. Then, at step S8, CPU 16 measures an output voltage from reference voltage generating circuit 11 by using ADC 22.

Figure 11:
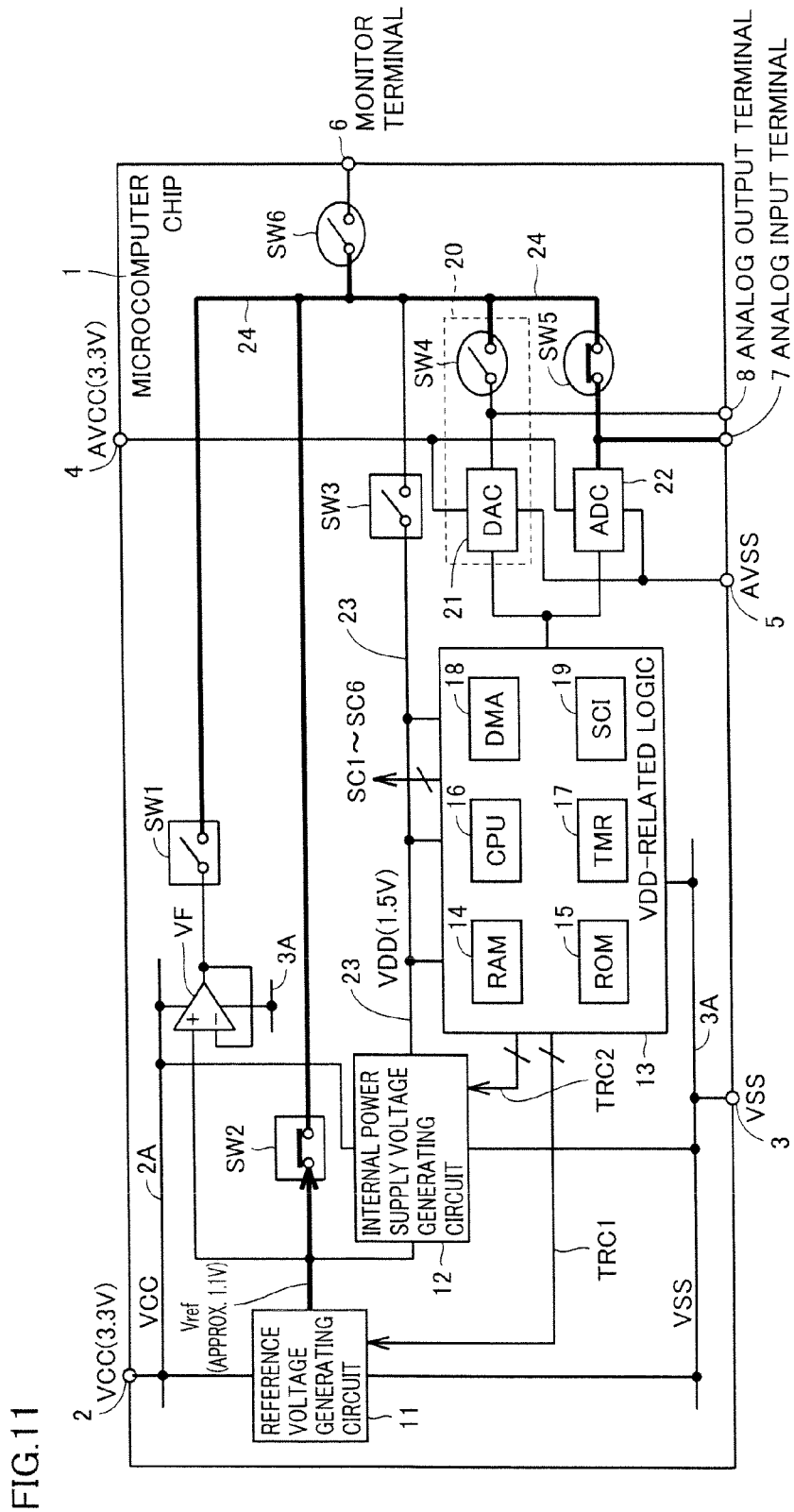
FIG. 11 is a diagram for explaining each of steps S7 and S8 in FIG. 9.

FIG. 11 is a diagram for explaining steps S7, S8 in FIG. 9. In FIG. 11, lines supplied with reference voltage Vref outputted from reference voltage generating circuit 11 are indicated by the bold lines. As is clear from a comparison to FIG. 10, it can be seen that, because the lines supplied with reference voltage Vref have already been pre-charged, charge sharing does not occur.

At next step S9 in FIG. 9, CPU 16 determines whether the voltage detected by ADC 22 at step S8 is equal to a desired voltage value or not. When the detected voltage is equal to the desired voltage value (YES at step S9), the processing ends. When the detected voltage is not equal to the desired voltage value (NO at step S9), CPU 16 changes the value of the register corresponding to trimming control signal TRC1 at next step S10. CPU 16 then repeats the processing from steps S3 to S9.

[Problems of Charge Sharing]

Figure 12:
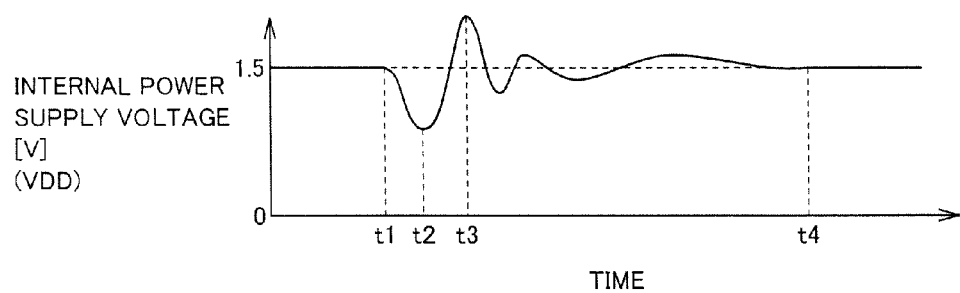
FIG. 12 is a diagram showing temporal changes in internal power supply voltage when charge sharing has occurred.

FIG. 12 is a diagram showing temporal changes in internal power supply voltage when charge sharing has occurred.

Referring to FIGS. 1 and 12, when the output node of reference voltage generating circuit 11 is connected to a line having a large parasitic capacitance without performing the pre-charge (a time point t1 in FIG. 12), reference voltage Vref drops temporarily due to charge sharing, because reference voltage generating circuit 11 does not have a high charge supplying capability. Such a drop in reference voltage Vref also causes a drop in internal power supply voltage VDD, which is an output from internal power supply voltage generating circuit 12 (a time point t2 in FIG. 12). Here, internal power supply voltage generating circuit 12 is a circuit for outputting an internal power supply voltage that is always constant by way of feedback control, and therefore, once it has sensed a drop in internal power supply voltage VDD through the feedback system, it functions to return internal power supply voltage VDD to the set value of 1.5 V. Here, the voltage is temporarily boosted excessively, causing overshoot of internal power supply voltage VDD (a time point t3 in FIG. 12). Then, after a voltage fluctuation as shown in FIG. 12, internal power supply voltage VDD ultimately returns to the set value of 1.5 V again (a time point t4 in FIG. 12).

The inventors of this invention ran a simulation to find the magnitudes of the undershoot and overshoot in FIG. 12. In the simulation, assuming a 150-nm process, the parasitic capacitance of the lines was set to 5 pF, and the set value of internal power supply voltage VDD was set to 1.5 V. Consequently, internal power supply voltage VDD undershot to around 1.1 V and overshot to around 2.2 V. If the operable range of the internal circuit is set to 1.5 V±10%, the voltage value of 1.1 V at the time of undershoot will fall below the lower limit operating voltage (1.35 V), with a possibility that the CPU may malfunction or run away out of control. The voltage value of 2.2 V at the time of overshoot exceeds an absolute maximum rating (2.1 V) of the internal circuit, potentially causing breakdown of the internal circuit.

In the case of microcomputer chip 1 according to this embodiment, the lines are pre-charged by charging circuit 20 before reference voltage generating circuit 11 and ADC 22 are connected to each other, and therefore, charge sharing does not occur. Accordingly, there is no possibility that the CPU may malfunction or run away out of control, nor of breakdown of the internal circuit. The use of a DAC usually provided in a microcomputer chip as charging circuit 20 also offers the advantage of eliminating the need to provide an extra circuit. Furthermore, unlike in conventional examples, measurement of reference voltage Vref is not conducted via a voltage follower, and therefore, measurement of reference voltage Vref more accurate than in conventional examples is achieved.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A semiconductor device comprising:
a voltage generating circuit for generating a voltage for output, said voltage generating circuit having a function to adjust a magnitude of said voltage to be generated;
a first switch having a first conduction terminal and a second conduction terminal not brought into conduction with each other in an OFF state, said first conduction terminal being connected to an output node of said voltage generating circuit via a first line;
a second switch having a third conduction terminal and a fourth conduction terminal brought into conduction with each other in an ON state, said third conduction terminal being connected to the second conduction terminal via a second line; and
a charging circuit connected to said fourth conduction terminal of said second switch for charging said second line via said second switch,
wherein said second line is charged by said charging circuit in said OFF state of said first switch and said ON state of said second switch.

2. The semiconductor device according to claim 1, wherein said charging circuit includes a digital-to-analog converter for converting an inputted digital value to an analog voltage for output, and
said second line is charged by the analog voltage outputted from said digital-to-analog converter in said OFF state of said first switch and said ON state of said second switch.

3. The semiconductor device according to claim 2, wherein an output node of said digital-to-analog converter is connected to said second line via said second switch,
said semiconductor device further comprises:
an analog-to-digital converter for converting an inputted analog voltage to a digital value for output; and
a third switch, and
an input node of said analog-to-digital converter is connected to said second line via said third switch.

4. The semiconductor device according to claim 1, wherein a length from said charging circuit to said second conduction terminal of said first switch via said second line is longer than a length from said first conduction terminal of said first switch to said voltage generating circuit via said first line.

5. A semiconductor device comprising:
a reference voltage generating circuit for generating a reference voltage for output, said reference voltage generating circuit having a function to adjust a magnitude of said reference voltage to be generated;
an internal power supply voltage generating circuit for generating an internal power supply voltage based on said reference voltage;
an internal circuit operating using said internal power supply voltage as a drive voltage;
a first switch having a first conduction terminal and a second conduction terminal not brought into conduction with each other in an OFF state, said first conduction terminal being connected to an output node of said reference voltage generating circuit via a first line;
a second switch having a third conduction terminal and a fourth conduction terminal brought into conduction with each other in an ON state, said third conduction terminal being connected to the second conduction terminal via a second line; and
a charging circuit connected to said fourth conduction terminal of said second switch for charging said second line via said second switch,
wherein said second line is charged by said charging circuit in said OFF state of said first switch and said ON state of said second switch.

6. The semiconductor device according to claim 5, wherein said charging circuit includes a digital-to-analog converter for converting an inputted digital value to an analog voltage for output, and
said second line is charged by the analog voltage outputted from said digital-to-analog converter in said OFF state of said first switch and said ON state of said second switch.

7. The semiconductor device according to claim 6, wherein an output node of said digital-to-analog converter is connected to said second line via said second switch,
said semiconductor device further comprises:
an analog-to-digital converter for converting an inputted analog voltage to a digital value for output; and
a third switch, and
an input node of said analog-to-digital converter is connected to said second line via said third switch.

8. The semiconductor device according to claim 5, wherein a length from said charging circuit to said second conduction terminal of said first switch via said second line is longer than a length from said first conduction terminal of said first switch to said reference voltage generating circuit via said first line.

* * * * *